United States Patent
Gabourie et al.

(10) Patent No.: US 11,176,477 B2
(45) Date of Patent: Nov. 16, 2021

(54) SYSTEM AND METHOD FOR UNSUPERVISED DOMAIN ADAPTATION VIA SLICED-WASSERSTEIN DISTANCE

(71) Applicant: HRL Laboratories, LLC, Malibu, CA (US)

(72) Inventors: Alexander J. Gabourie, Stanford, CA (US); Mohammad Rostami, Los Angeles, CA (US); Soheil Kolouri, Agoura Hills, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/719,668

(22) Filed: Dec. 18, 2019

(65) Prior Publication Data

US 2020/0125982 A1 Apr. 23, 2020

Related U.S. Application Data

(63) Continuation-in-part of application No. 16/262,878, filed on Jan. 30, 2019.

(60) Provisional application No. 62/627,179, filed on Feb. 6, 2018, provisional application No. 62/807,716, filed on Feb. 19, 2019.

(51) Int. Cl.
  *G06N 7/00* (2006.01)
  *G05D 1/00* (2006.01)
  *G06N 20/00* (2019.01)

(52) U.S. Cl.
  CPC .......... *G06N 7/005* (2013.01); *G05D 1/0088* (2013.01); *G06N 20/00* (2019.01)

(58) Field of Classification Search
  CPC ...... G06N 7/005; G06N 20/00; G06N 3/0454; G06N 3/0445; G06N 3/088; G06N 3/084; G06N 3/006; G05D 1/0088
  See application file for complete search history.

(56) References Cited

U.S. PATENT DOCUMENTS

2017/0161633 A1  6/2017  Clinchant et al.
2017/0206434 A1  7/2017  Nariyambut Murali et al.

FOREIGN PATENT DOCUMENTS

WO  WO2017192194 A2  11/2017

OTHER PUBLICATIONS

Kolouri, Soheil, Yang Zou, and Gustavo K. Rohde. "Sliced Wasserstein kernels for probability distributions." Proceedings of the IEEE Conference on Computer Vision and Pattern Recognition. 2016. (Year: 2016).*

(Continued)

*Primary Examiner* — Menatoallah Youssef
(74) *Attorney, Agent, or Firm* — Tope-McKay & Associates

(57) ABSTRACT

Described is a system for unsupervised domain adaptation in an autonomous learning agent. The system adapts a learned model with a set of unlabeled data from a target domain, resulting in an adapted model. The learned model was previously trained to perform a task using a set of labeled data from a source domain. The set of labeled data has a first input data distribution, and the set of unlabeled target data has a second input data distribution that is distinct from the first input data distribution. The adapted model is implemented in the autonomous learning agent, causing the autonomous learning agent to perform the task in the target domain.

9 Claims, 7 Drawing Sheets

(56) References Cited

OTHER PUBLICATIONS

Yoo, Jaeyoon, et al. "Domain adaptation using adversarial learning for autonomous navigation." arXiv preprint arXiv:1712.03742 (2017). (Year: 2017).*

Gabourie, A. J., Rostami, M., Pope, P. E., Kolouri, S., & Kim, K. (Sep. 2019). Learning a Domain-Invariant Embedding for Unsupervised Domain Adaptation Using Class-Conditioned Distribution Alignment. 2019 57th Annual Allerton Conference on Communication, Control, and Computing pp. 352-359 (Year: 2019).*

Notification of Transmittal, the International Search Report, and the Written Opinion of the International Searching Authority for PCT/US2019/067259; dated Apr. 14, 2020.

Jaeyoon Yoo et al: "Domain Adaptation Using Adversarial Learning for Autonomous Navigation", arxiv .org, Cornell University Library, 201 Olin Library Cornell University Ithaca, NY 14853, Dec. 11, 2017 (Dec. 11, 2017), XP081320179, abstract; figure 1, 1. Introduction, 2.2 Domain Adaptation, 3. Method.

Zou Yang et al: "Unsupervised Domain Adaptation for Semantic Segmentation via Class-Balanced Self-training", Oct. 7, 2018 (Oct. 7, 2018), ROBOCUP 2008: ROBOCUP 2008 : Robot Soccer World Cup XII; [Lecture Notes in Computer Science; Lect. Notes Computer], Springer, International Publishing, Cham, pp. 297-313, XP047498238, IS BN: 978-3-319-10403-4 [retrieved on Oct. 7, 2018] abstract; figure 1, 1. Introduction, 3. Preliminaries, 4. Proposed Method.

Pan, S.J. and Yang, Q., A survey on transfer learning. IEEE Transactions on knowledge and data engineering, 22(10), pp. 1345-1359, 2010.

Motiian S, Jones Q, Iranmanesh S, Doretto G. Few-Shot Adversarial Domain Adaptation, In Advances in Neural Information Processing Systems, pp. 6673-6683, 2017.

Luo, Z., Zou, Y., Hoffman, J. and Fei-Fei, L.F., Label Efficient Learning of Transferable Representations Across Domains and Tasks. In Advances in Neural Information Processing Systems, pp. 164-176, 2017.

Murez, Z., Kolouri, S., Kriegman, D., Ramamoorthi, R. and Kim, K., Image to Image Translation for Domain Adaptation. CVPR 2018, 2017, pp. 4500-4509.

Hagan, M.T. and Menhaj, M.B., Training feedforward networks with the Marquardt algorithm. IEEE transactions on Neural Networks, 5(6), pp. 989-993, 1994.

Arjovsky, M., Chintala, S. and Bottou, L., Wasserstein gan. arXiv preprint arXiv:1701.07875, pp. 1-32, 2017.

Kolouri, S., Rohde, G.K. and Hoffman, H., Sliced Wasserstein Distance for Learning Gaussian Mixture Models. CVPR 2018, pp. 3427-3436, 2017.

Kolouri, S., Martin, C.E. and Rohde, G.K., Sliced-Wasserstein Autoencoder: An Embarrassingly Simple Generative Model. arXiv preprint arXiv:1804.01947, pp. 1-25, 2018.

Sankaranarayanan, S., Balaji, Y., Castillo, C. D., and Chellappa, R., Generate to adapt: Aligning domains using generative adversarial networks. In CVPR, pp. 8503-8512, 2018.

Liu, M., and Tuzel, O., Coupled generative adversarial networks. In Advances in neural information processing systems, pp. 469-477, 2016.

Tzeng, E., Hoffman, J., Saenko, K., and Darrell, T., Adversarial discriminative domain adaptation. In Computer Vision and Pattern Recognition (CVPR), vol. 1, 4, pp. 2962-2971, 2017.

Hoffman, J., Tzeng, E., Park, T., Zhu, J., Isola, P., Saenko, K., Efros, A. A., and Darrell, T., Cycada: Cycle-consistent adversarial domain adaptation. In ICML, pp. 1-10, 2018.

Ganin, Y., and Lempitsky, V., Unsupervised domain adaptation by backpropagation. In ICML, pp. 1-10, 2014.

Ghifary, M., Kleijn, W. B., Zhang, M., Balduzzi, D., and Li, W., Deep reconstruction-classification networks for unsupervised domain adaptation. In European Conference on Computer Vision, pp. 597-613, 2016.

Saito, K., Ushiku, Y., and Harada, T., Asymmetric tri-training for unsupervised domain adaptation. In ICML, pp. 1-10, 2018.

Courty, N., Flamary, R., Tuia, D., and Rakotomamonjy, A., Optimal transport for domain adaptation. IEEE TPAMI 39 (9): pp. 1853-1865, 2017.

Seguy, V., Damodaran, B. B., Flamary, R., Courty, N., Rolet, A., and Blondel, M., Large-scale optimal transport and mapping estimation. In ICLR, pp. 1-15, 2018.

Gabourie, A., Rostami, M., Pope, P., Kolouri, S., and Kim, K., Learning a domain-invariant embedding for unsupervised domain adaptation using class-conditioned distribution alignment. In 2019 57th Annual Allerton Conference on Communication, Control, and Computing, pp. 352-359, 2019.

J. Hoffman, D. Wang, F. Yu, and T. Darrell, "Fcns in the wild: Pixel-level adversarial and constraint-based adaptation," arXiv preprint arXiv:1612.02649, 2016, pp. 597-613 and Supplemental Material pp. 1-5.

M. Ghifary, W. B. Kleijn, M. Zhang, D. Balduzzi, and W. Li, "Deep reconstruction-classification networks for unsupervised domain adaptation," in European Conference on Computer Vision. Springer, pp. 597-613, 2016.

J.-Y. Zhu, T. Park, P. Isola, and A. A. Efros, "Unpaired image-to-image translation using cycle-consistent adversarial networks," arXiv preprint arXiv:1703.10593, 2017, pp. 1-18.

A. Gaidon, Q. Wang, Y. Cabon, and E. Vig, "Virtual worlds as proxy for multi-object tracking analysis," in Proceedings of the IEEE Conference on Computer Vision and Pattern Recognition, pp. 4340-4349, 2016.

M. Cordts, M. Omran, S. Ramos, T. Rehfeld, M. Enzweiler, R. Benenson, U. Franke, S. Roth, and B. Schiele, "The cityscapes dataset for semantic urban scene understanding," in Proc. of the IEEE Conference on Computer Vision and Pattern Recognition (CVPR), 2016, pp. 3213-3223.

I. Goodfellow, J. Pouget-Abadie, M. Mirza, B. Xu, D. Warde-Farley, S. Ozair, A. Courville, and Y. Bengio, "Generative adversarial nets," in Advances in neural information processing systems, pp. 2672-2680, 2014.

X. Mao, Q. Li, H. Xie, R. Y. Lau, and Z. Wang, "Multi-class generative adversarial networks with the l2 loss function," arXiv preprint arXiv:1611.04076, 2016, pp. 1-15.

M. Arjovsky, S. Chintala, and L. Bottou, "Wasserstein gan," arXiv preprint arXiv:1701.07875, 2017, pp. 1-32.

F. Yu, V. Koltun, and T. Funkhouser, "Dilated residual networks," arXiv preprint arXiv:1705.09914, 2017, pp. 1-9.

G. Huang, Z. Liu, K. Q. Weinberger, and L. van der Maaten, "Densely connected convolutional networks," arXiv preprint arXiv:1608.06993, 2016, pp. 1-9.

Zak Murez, Soheil Kolouri, David Kriegman, Ravi Ramamoorthi, Kyungnam Kim, "Image to Image Translation for Domain Adaptation," arXiv:1712.00479v1 [cs.CV] Dec. 1, 2017, pp. 1-11.

Notification of Transmittal of International Search Report and the Written Opinion of the International Searching Authority for PCT/US2019/015927; dated May 21, 2019.

International Search Report of the International Searching Authority for PCT/US2019/015927; dated May 21, 2019.

Written Opinion of the International Searching Authority for PCT/US2019/015927; dated May 21, 2019.

Zak Murez et al. 'Image to Image Translation for Domain Adaptation', arXiv:1712.00479v1, Dec. 1, 2017.

Yaroslav Ganin, et al., "Unsupervised Domain Adaptation by Backpropagation," arXiv: 1409.749v2, Feb. 27, 2015.

Notification of the International Preliminary Report on Patentability Chapter I for PCT/US2019/015927; dated Aug. 20, 2020.

The International Preliminary Report on Patentability Chapter I for PCT/US2019/015927; dated Aug. 20, 2020.

Notification of and the International Preliminary Report on Patentability Chapter II for PCT/US2019/067259; dated Mar. 31, 2021.

Claims for the International Preliminary Report on Patentability Chapter II for PCT/US2019/067259; date of mailing Mar. 31, 2021.

\* cited by examiner

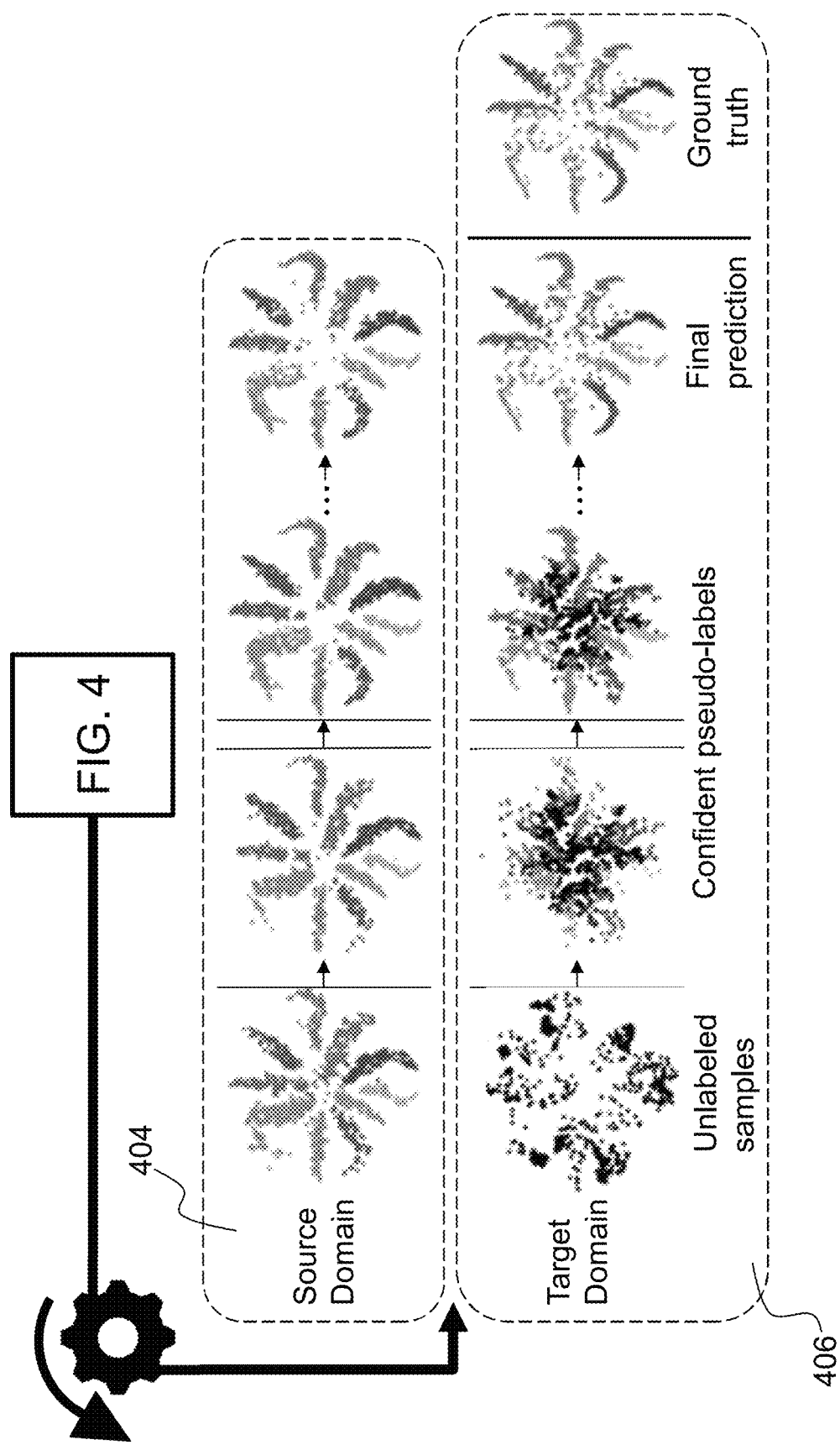

| Method | $m \to u$ | $u \to m$ | $s \to m$ | $s \to u$ | $ST \to CI$ | $CI \to ST$ |
|---|---|---|---|---|---|---|
| GtA | 92.8 ± 0.9 | 90.8 ± 1.3 | 92.4 ± 0.9 | - | - | - |
| CoGAN | 91.2 ± 0.8 | 89.1 ± 0.8 | - | - | - | - |
| ADDA | 89.4 ± 0.2 | 90.1 ± 0.8 | 76.0 ± 1.8 | - | - | - |
| CyCADA | 95.6 ± 0.2† | 96.5 ± 0.1† | 90.4 ± 0.4 | - | - | - |
| I2I-Adapt | 92.1† | 87.2† | 80.3 | - | - | - |
| FADA | 89.1 | 81.1 | 72.8 | 78.3 | - | - |
| RevGrad | 77.1 ± 1.8‡ | 73.0 ± 2.0‡ | 73.9 | - | - | - |
| DRCN | 91.8 ± 0.1† | 73.7 ± 0.04† | 82.0 ± 0.2 | - | 58.9 ± 0.1 | 66.4 ± 0.1 |
| AUDA | - | - | 86.0 | - | - | - |
| OPDA | 70.0 | 60.2 | - | - | - | - |
| MML | 77.9† | 60.5† | 62.9 | - | - | - |

FIG. 6A

| Method | $m \to u$ | $u \to m$ | $s \to m$ | $s \to u$ | $ST \to CI$ | $CI \to ST$ |
|---|---|---|---|---|---|---|
| Target (FS) | 96.8 ± 0.2 | 98.5 ± 0.2 | 98.5 ± 0.2 | 96.8 ± 0.2 | 81.5 ± 1.0 | 64.8 ± 1.7 |
| ResNet (FS) | 95.8 ± 0.4 | 98.0 ± 0.5 | 98.0 ± 0.5 | 95.8 ± 0.4 | 81.3 ± 1.6 | 55.2 ± 1.5 |
| VGG | 90.1 ± 2.6 | 80.2 ± 5.7 | 67.3 ± 2.6 | 66.7 ± 2.7 | 53.8 ± 1.4 | 63.4 ± 1.2 |
| DACAD | 92.4 ± 1.2 | 91.1 ± 3.0 | 80.0 ± 2.7 | 79.6 ± 3.3 | 54.4 ± 1.9 | 66.5 ± 1.0 |
| ResNet | 86.6 ± 6.8 | 82.9 ± 9.3 | 62.3 ± 3.6 | 64.3 ± 3.2 | 44.3 ± 0.8 | 63.3 ± 1.2 |
| DACAD | 93.6 ± 1.0 | 95.8 ± 1.3 | 82.0 ± 3.4 | 78.0 ± 2.0 | 44.4 ± 0.4 | 65.7 ± 1.0 |
| DRCN | 88.6 ± 1.3 | 89.6 ± 1.3 | 74.3 ± 2.8 | 54.9 ± 1.8 | 50.0 ± 1.5 | 64.2 ± 1.7 |
| DACAD | 94.5 ± 0.7 | 97.7 ± 0.3 | 88.2 ± 2.8 | 82.6 ± 2.9 | 55.0 ± 1.4 | 65.9 ± 1.4 |

FIG. 6B

SYSTEM AND METHOD FOR UNSUPERVISED DOMAIN ADAPTATION VIA SLICED-WASSERSTEIN DISTANCE

CROSS-REFERENCE TO RELATED APPLICATIONS

The present application is a Continuation-in-Part application of U.S. application Ser. No. 16/262,878, filed in the United States on Jan. 30, 2019, which is a Non-Provisional Application of U.S. Provisional Application No. 62/627,179, filed in the United States on Feb. 6, 2018, entitled, "Domain Adaptation Learning System," the entirety of which are incorporated herein by reference.

The present application is also a Non-Provisional Application of U.S. Provisional Application No. 62/807,716, filed in the U.S. on Feb. 19, 2019, entitled, "System and Method for Unsupervised Domain Adaptation Via Sliced-Wasserstein Distance," the entirety of which is incorporated herein by reference.

BACKGROUND OF INVENTION

(1) Field of Invention

The present invention relates to a system for unsupervised transfer learning and, more particularly, to a system for unsupervised transfer learning that can adapt to domain shifts in the input data without any human intervention.

(2) Description of Related Art

Transfer Learning (described in Literature Reference No. 1 in the List of Incorporated Literature References), also referred to as unsupervised domain adaptation (UDA), has been developed as a framework to use past experience (i.e., learned models from fully annotated source data) to improve learning speed and prediction accuracy for a model learned using sparsely labeled, or unlabeled, target data. The most common scenario of transfer learning occurs when there is access to abundant data points in the target domain, but no corresponding labels. Motiian et. al. (see Literature Reference No. 2) exploits adversarial learning for this scenario. Their idea was to learn a joint embedding subspace for both target and source domains to align them in the embedding domain. Upon learning the embedding space, a joint classifier for both domains can be learned to handle the labeled data scarcity in the target task. Further, Luo et. al. (see Literature Reference No. 3) used cross entropy loss as a measure of similarity between two domains to learn the joint embedding directly without using adversarial learning. Prior work on transfer learning (see Literature Reference No. 4) focused on joint optimization over the source and target domains and required having to learn models from scratch.

Thus, a continuing need exists for a transfer learning method that does not have to learn from previous models and does not require intervention to master new data.

SUMMARY OF INVENTION

The present invention relates to a system for unsupervised transfer learning, and more particularly, to a system for unsupervised transfer learning that can adapt to domain shifts in the input data without any human intervention. The system comprises one or more processors and a non-transitory computer-readable medium having executable instructions encoded thereon such that when executed, the one or more processors perform multiple operations. The system adapts a learned model with a set of unlabeled data from a target domain, resulting in an adapted model. The learned model was previously trained to perform a task using a set of labeled data from a source domain. The set of labeled data has a first input data distribution, and the set of unlabeled target data has a second input data distribution that is distinct from the first input data distribution. The adapted model is implemented in the autonomous learning agent, and the system causes the autonomous learning agent to perform the task in the target domain.

In another aspect, sliced-Wasserstein (SW) distance is used as a dissimilarity measure for determining dissimilarity between the first input data distribution and the second input data distribution.

In another aspect, the system generates pseudo-labels for the set of unlabeled data.

In another aspect, the SW distance is conditioned on labels from the set of labeled data and the pseudo-labels to align the first input data distribution and the second input data distribution.

In another aspect, the autonomous learning agent is an autonomous driving system and the task is a functional movement response.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5 is an illustration of the embedding space evolving during training according to some embodiments of the present disclosure;

FIG. 6A is a first section of a table illustrating classification accuracy for various datasets according to some embodiments of the present disclosure; and FIG. 6B is a second section of the table in FIG. 6A, illustrating classification accuracy for various datasets according to some embodiments of the present disclosure.

DETAILED DESCRIPTION

Figure 1:
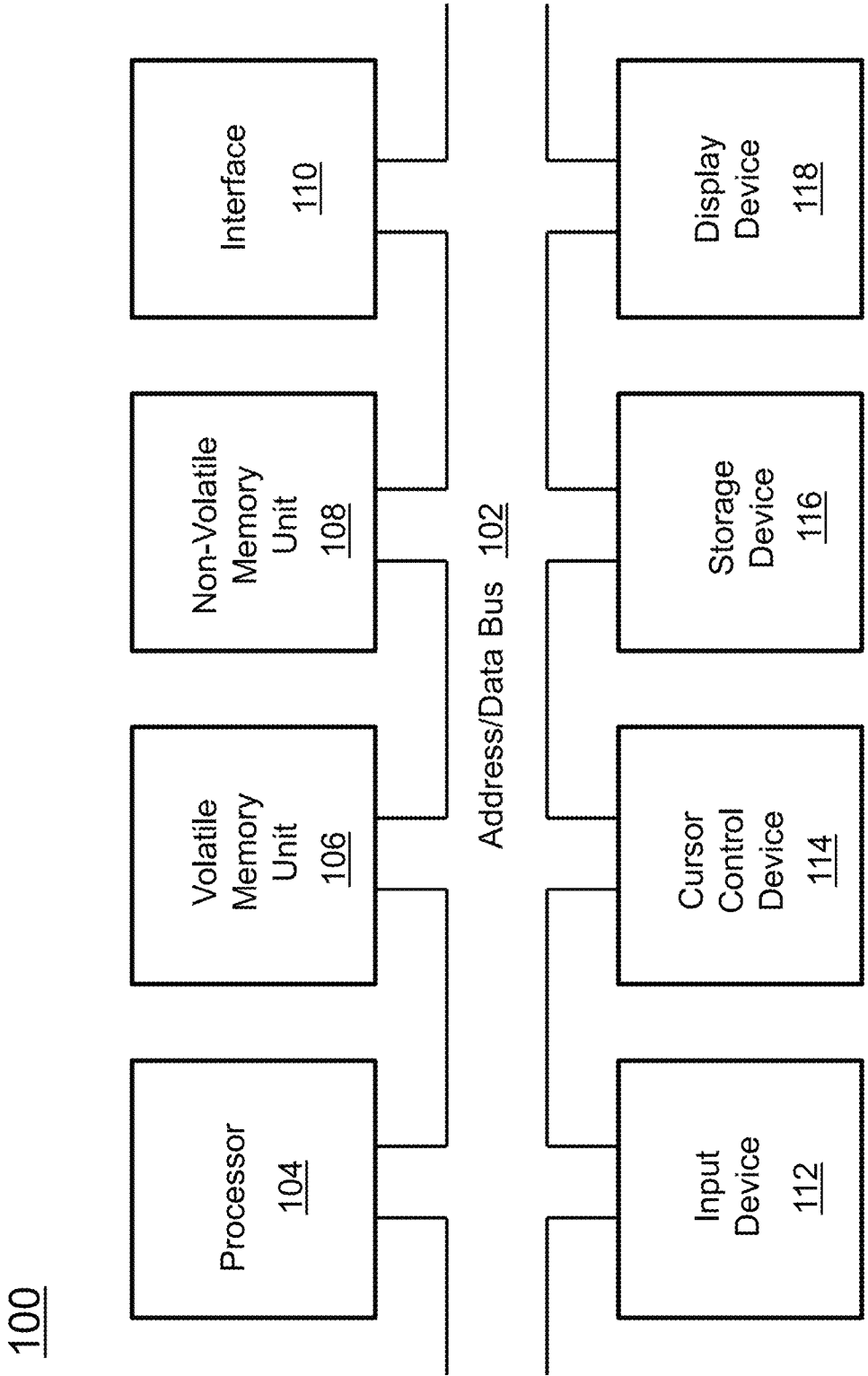
FIG. 1 is a block diagram depicting the components of a system for unsupervised transfer learning according to some embodiments of the present disclosure.

The present invention relates to a system for unsupervised transfer learning, and more particularly, to a system for unsupervised transfer learning that can adapt to domain shifts in the input data without any human intervention. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Pan, S. J. and Yang, Q., A survey on transfer learning. IEEE Transactions on knowledge and data engineering, 22 (10), pp. 1345-1359, 2010.
2. Motiian S, Jones Q, Iranmanesh S, Doretto G. Few-Shot Adversarial Domain Adaptation, In Advances in Neural Information Processing Systems, pp. 6673-6683, 2017.
3. Luo, Z., Zou, Y., Hoffman, J. and Fei-Fei, L. F., Label Efficient Learning of Transferable Representations Across Domains and Tasks. In Advances in Neural Information Processing Systems, pp. 164-176, 2017.
4. Murez, Z., Kolouri, S., Kriegman, D., Ramamoorthi, R. and Kim, K., Image to Image Translation for Domain Adaptation. CVPR 2018, 2017.
5. Hagan, M. T. and Menhaj, M. B., Training feedforward networks with the Marquardt algorithm, IEEE transactions on Neural Networks, 5 (6), pp. 989-993, 1994.
6. Arjovsky, M., Chintala, S. and Bottou, L., Wasserstein gan. arXiv arXiv:1701.07875, 2017.
7. Kolouri, S., Rohde, G. K. and Hoffman, H. Sliced Wasserstein Distance for Learning Gaussian Mixture Models. CVPR 2018, 2017.
8. Kolouri, S., Martin, C. E. and Rohde, G. K., Sliced-Wasserstein Autoencoder: An Embarrassingly Simple Generative Model. arXiv preprint arXiv:1804.01947, 2018.
9. Sankaranarayanan, S., Balaji, Y., Castillo, C. D., and Chellappa, R., Generate to adapt: Aligning domains using generative adversarial networks. In *CVPR,* 2018.
10. Liu, M., and Tuzel, O., Coupled generative adversarial networks. In Advances in neural information processing systems, 469-477, 2016.
11. Tzeng, E., Hoffman, J., Saenko, K., and Darrell, T., Adversarial discriminative domain adaptation. In Computer Vision and Pattern Recognition (CVPR), volume 1, 4, 2017.
12. Hoffman, J., Tzeng, E., Park, T., Zhu, J., Isola, P., Saenko, K., Efros, A. A., and Darrell, T., Cycada: Cycle-consistent adversarial domain adaptation. In ICML, 2018.
13. Ganin, Y., and Lempitsky, V., Unsupervised domain adaptation by backpropagation. In ICML, 2014.
14. Ghifary, M., Kleijn, W. B., Zhang, M., Balduzzi, D., and Li, W., Deep reconstruction-classification networks for unsupervised domain adaptation. In European Conference on Computer Vision, 597-613, 2016.
15. Saito, K., Ushiku, Y., and Harada, T., Asymmetric tri-training for unsupervised domain adaptation. In ICML, 2018.
16. Courty, N., Flamary, R., Tuia, D., and Rakotomamonjy, A., Optimal transport for domain adaptation. IEEE TPAMI 39 (9):1853-1865, 2017.
17. Seguy, V., Damodaran, B. B., Flamary, R., Courty, N., Rolet, A., and Blondel, M., Large-scale optimal transport and mapping estimation. In ICLR, 2018.
18. Gabourie, A., Rostami, M., Pope, P., Kolouri, S., and Kim, K., Learning a domain-invariant embedding for unsupervised domain adaptation using class-conditioned distribution alignment. In 2019 57$^{th}$ Annual Allerton Conference on Communication, Control, and Computing, 2019.

(2) Principal Aspects

Various embodiments of the invention include three "principal" aspects. The first is a system for unsupervised transfer learning. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
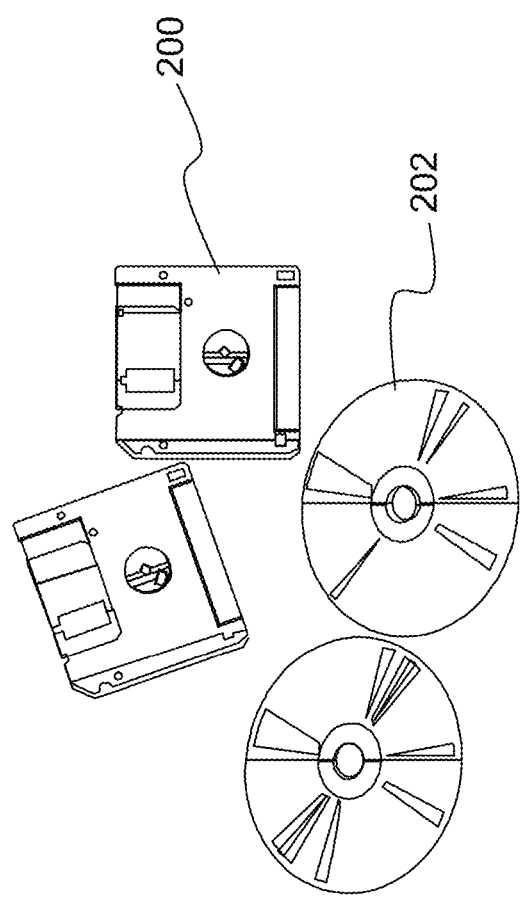
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Figure 3:
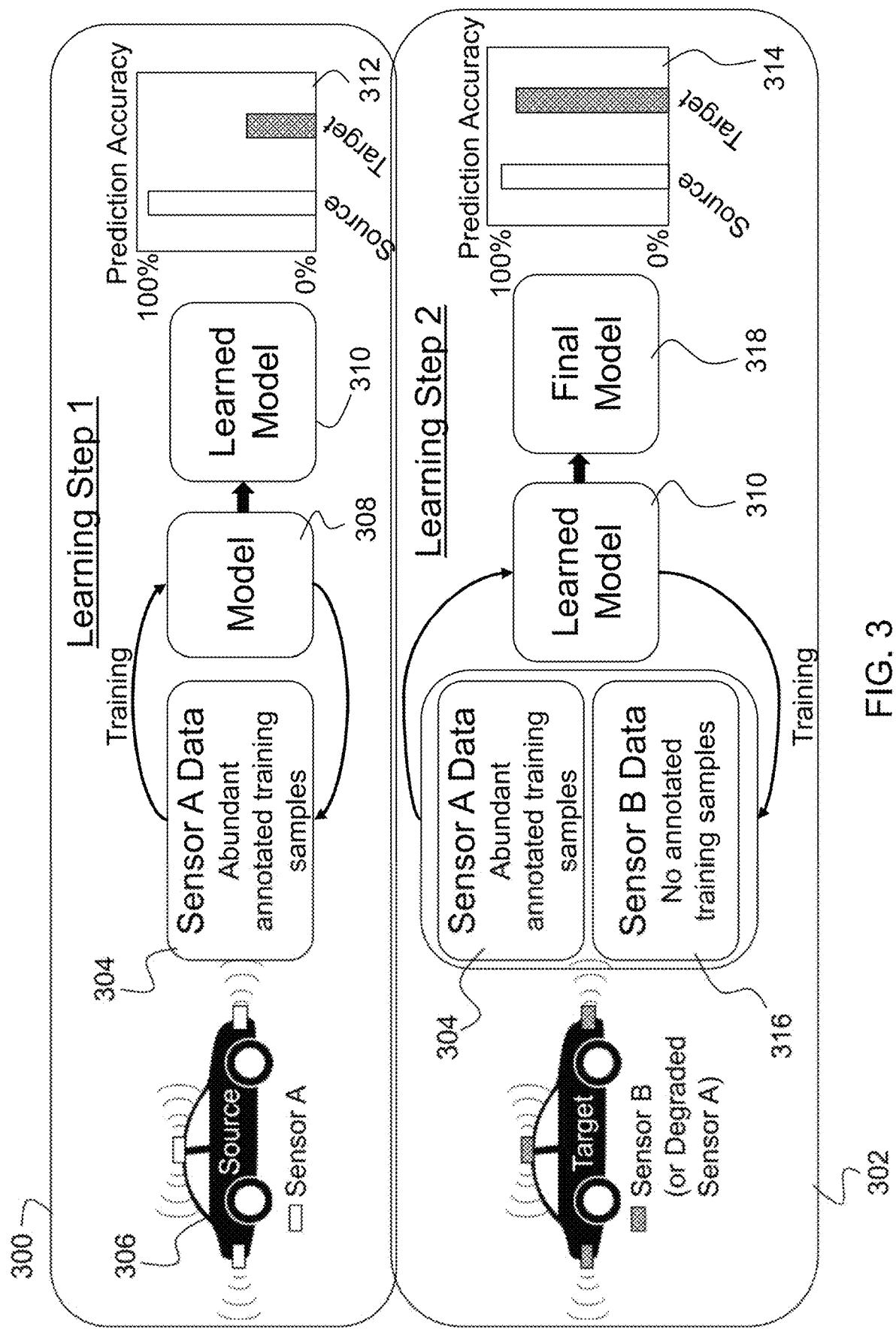
FIG. 3 is a diagram illustrating both learning steps of the unsupervised transfer learning method according to some embodiments of the present disclosure.

Described is a method that enables machines to learn with no labeled data by leveraging knowledge from an auxiliary data source with readily available labels (e.g., synthetic dataset). Here, the model's task (e.g., classification) remains the same, but the distribution of input data to the model is subject to change. The auxiliary dataset with available labels will be referred to as the source and the second, unlabeled dataset will be the target. FIG. 3 is a high-level diagram illustrating the two learning steps, Learning Step 1 (element 300) and Learning Step 2 (element 302), of the unsupervised transfer learning method according to embodiments of the present disclosure.

In Learning Step 1 (element 300), source data is obtained. For example, the source data can be sensor A data (element 304) obtained from a sensor A in a vehicle (element 306), non-limiting examples of which include a radar sensor that determines distance of the vehicle from other objects, a LIDAR sensor, and an image sensor. The sensor A data (element 304) comprises abundant annotated training samples which is used to train a model (element 308), resulting in a learned model (element 310). The plot (element 312) for Learning Step 1 (element 300) shows how a typical model performs for the source and target data when the task is trained with only the sensor A data (element 304). The plot (element 314) for Learning Step 2 (element 302) illustrates how the model is updated to perform the task well with both source and target data. In one embodiment, the target dataset, referred to as sensor B data (element 316) is input from dirty, different, or degraded sensors collected after the system has been deployed. In Learning Step 1 (element 300), a model is learned (element 310), through fully-supervised training with the labeled source dataset (i.e., sensor A data (element 304) to complete the task (e.g., object detection, image classification, image registration). In Learning Step 2 (element 302), the learned model (element 310) is used as a starting point, and the target data (i.e., sensor B data (element 316) is incorporated into training to learn the task for both source and target data distributions, resulting in a final model (element 318).

Since there are no required special conditions for Learning Step 1 (element 300), models learned (element 310) before the invention described herein can be repurposed and used with Learning Step 2 (element 302). The resulting final model (element 318) could be utilized in an autonomous driving system, for example, where the initial models (e.g., element 308) and dataset (e.g., sensor A data (element 304)) are expensive to train, but the input data to the system may change. Depending on a company's goal, electro-optical (EO) or other sensors (e.g., RADAR, LIDAR) may change during the product development or lifecycle. Additionally, dirty or degraded sensors may give distorted input. While the sensors act to image the same objects, their input distributions to a model will be different. The method according to embodiments of the present disclosure enables previously learned models (element 310) to easily adapt to the new conditions without need for intervention.

Two purposes of the invention described herein include: 1) to enable an autonomous learning agent to leverage its previously learned knowledge to adapt to different input data distributions; and 2) to eliminate the need for labeled samples (which necessitate human intervention) that are required to adapt to the new input. The method described herein enables the system to be trained on new input data with no annotations, using only annotations from auxiliary data source(s). Given a problem where there is a significant amount of annotated training data in the source domain (e.g., EO, synthetic domain), the machine learns from this data in the first training phase (i.e., Learning Step 1 (element 300)). During the second training phase (i.e., Learning Step 2 (element 302)), which would likely occur after system deployment, there is access to an unlabeled dataset (e.g., sensor B data (element 316)) which completes the same task as the source domain data (e.g., sensor A data (element 304)), but has samples that are distributed differently than those from the source domain.

(3.1) Learning Step 1 (Before Deployment)

Let $X_S = [x_1^s, \ldots, x_N^s] \in R^{d \times N}$ be the training data and $Y_S = [y_1^s, \ldots, y_N^s] \in R^{k \times N}$ be the corresponding labels of the source dataset, where each sample, $x_i^s$, could belong to one or more k available categories. R denotes the Euclidean space, while d denotes the dimension of input data, and N denotes the number of samples. $x_i^s \in R^d$ indicates that the $i^{th}$ source data sample $x_1^s$ belongs to a d-dimensional Euclidean space $R^d$. $X_S = [x_1^s, \ldots, x_N^s] \in R^{d \times N}$ denotes that the source dataset $X_S$ contains N samples, each of which live in the d-dimensional Euclidean space. Therefore, $R^{d \times N}$ is indicating N samples in a d-dimensional Euclidean space. Each sample is assumed to be drawn independent and identically distributed (i.i.d.) from the source joint probability distribution (i.e., $(x_i^s, y_i) \sim p_S(x^S, y)$). The machine is equipped with a neural network. In one embodiment, the neural network is a convolutional neural network. In another embodiment, the neural network is a recurrent neural network. In yet another embodiment, the neural network is a hybrid of convolutional and recurrent neural network. In another embodiment, the neural network is a capsule network that provides a parametric mapping from samples $X_S$ to a latent space Z, $\phi_v : X_S \to Z$.

Additionally, a linear classifier, $h_w$ is defined that maps the latent space Z to the labels Y, $\rho_w : Z \to Y_S$. The composition of $\phi_v$ and $h_w$ defines a function that maps samples, $X_S$, to the labels, $Y_S$, $h_w(\phi_v(\cdot)) : X_S \to Y_S$, and is trained via the classic back-propagation technique (as described in Literature Reference No. 5) during training. Here, $v$ and $w$ are the corresponding learnable parameters of the neural network. Note that, from an application point of view, the mapping $\phi_v$ captures the nonlinearities in the sample space by extracting useful features from the dataset, X, such that the mapping between the two spaces could be modeled to be linear.

Figure 4:
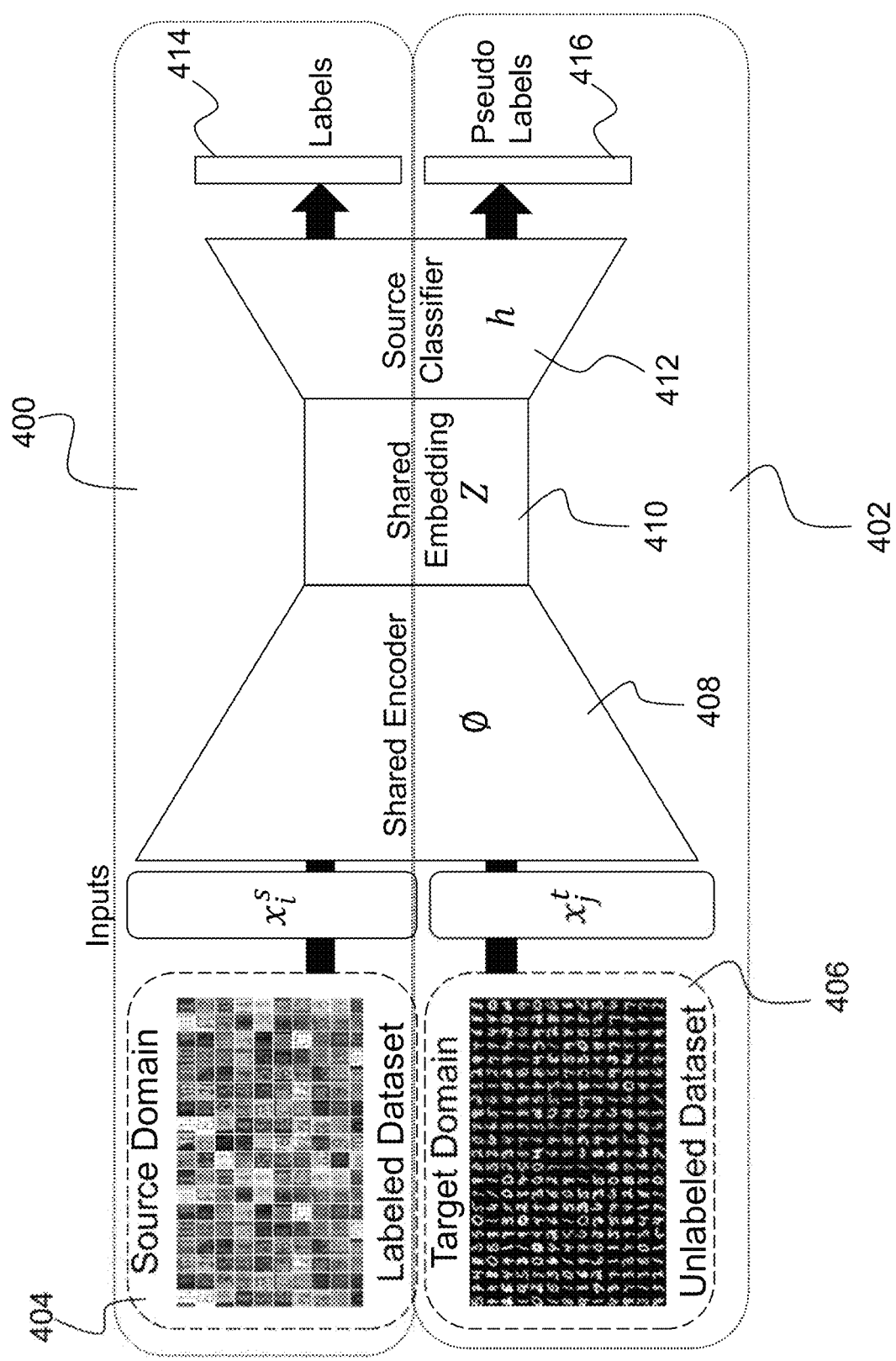
FIG. 4 is an illustration of a prediction network system architecture according to some embodiments of the present disclosure.

FIG. 4 illustrates the system architecture for the source dataset learning problem. The top data path (element 400) represents training using the labeled dataset/source domain data (element 402), whereas the bottom data path (element 404) represents the unlabeled dataset/target domain data (element 406) for benchmarking the new datasets with the system trained on only the source dataset in the top data path (element 400). Both the source and target dataset predictions (i.e., labels for each data point) are computed with the same network, including a shared encoder (element 408), a shared embedding (element 410), and a source classifier (element 412), but parameters are based only on the labeled dataset/ source domain data (element 402) after Learning Step 1 and both the source and target datasets after Learning Step 1. Non-limiting examples of parameters include regularization parameters and network structural parameters, such as number of nodes. As described above, the source domain data (element 402) has corresponding labels (element 414), while pseudo-labels (element 416) (also referred to as learned labels) are generated for the target domain data (element 406) to create class distribution alignment between the source domain data (element 402) and target domain data (element 406), which will be described in further detail below. Pseudo-labels are determined by taking the labels that the model is confident about.

(3.2) Learning Step 2 (Deployment)

During deployment, the machine is required to map the newly observed data $X_T=[x_1^t, \ldots, x_N^t] \in \mathbb{R}^{d \times N}$ to labels $X_T=[y_1^t, \ldots, y_N^t] \in \mathbb{R}^{k \times N}$. It is assumed that the samples are drawn from the target marginal distribution $x_i^t \sim p_T$. It is also known that the target distribution is different from the source distribution (i.e., $p_s \neq p_T$). Additionally, the pre-trained network from learning step 1, which provides the mapping $h_w(\phi_v(\cdot)): X_S \to Y_S$, will not perform well on the target data distribution. In addition and as opposed to learning step 1, the machine does not have access to a large pool of labeled data and is required to adapt itself to the newly observed data without any labeled samples. To address this challenging problem, a unique framework is utilized to ensure that, after training step 2, both the source and target datasets can be learned with high performance (i.e., the mapping $h_w(\phi_v(\cdot))$ is domain agnostic). Using the architecture from FIG. 4, both data paths (elements 400 and 402), and the weights from training step 1 (i.e., network parameters that defined the network and need to be learned/trained) are used as an initialization, and the function is updated to optimize $h_w$ and $\phi_v$ according to:

$$\min_{w,v} \sum_{i=1}^{N} \mathcal{L}(h_w(\phi_v(x_i^s)), y_i^s) + \lambda D(p_S(\phi_v(X_S)), p_T(\phi_v(X_T))), \quad (1)$$

where $\mathcal{L}(\cdot,\cdot)$ is the empirical risk (used in learning step 1) for classifying the source labeled data points with the source classifier (element 412) from the embedding space of the shared embedding (element 410), $D(\cdot,\cdot)$ is a dissimilarity measure between distributions, and $\lambda$ is a trade-off parameter. Empirical risk is defined as the model average error on the training data. The embedding is modeled as the output space of the encoder subnetwork. Trade-off parameters determine the given weight for each of the two terms in the equation. The dissimilarity measure in the equation above has not yet been selected, and the definition and special conditions will be described below.

For the choice of dissimilarity measure between distributions, it is noted that KL-divergence and its variations have been extensively used as a measure of dissimilarity between probability distributions. These measures, however, have been shown in Literature Reference Nos. 6-8 to perform poorly when the distributions are supported on non-overlapping low-dimensional manifolds. Wasserstein distances, on the other hand, have been shown to be a more robust alternative to the KL-divergence and its variations (e.g., the Jensen-Shannon divergence). Sliced-Wasserstein distances were utilized as a metric for probability distributions in Equation (1) according to the following:

$$\min_{w,v} \sum_{i=1}^{N} \mathcal{L}(h_w(\phi_v(x_i^s)), y_i^s) + \quad (2)$$

$$\lambda \sum_{j=1}^{k} SW_2^2(p_S(\phi_v(X_S) | C_j), p_T(\phi_v(X_T) | C_j)),$$

where the sliced-Wasserstein between two m-dimensional distributions p and q is defined as:

$$SW_2^2(p,q) = \int_{S^{m-1}} \int_R |RP(t,\theta)|^2 dt d\theta, \quad (3)$$

where $S^{m-1}$ is the unit sphere in the m-dimensional latent space, $RP(t, \theta)$ is the cumulative distribution of the marginal distribution $Rp(\cdot, \theta)$:

$$RP(t,\theta) = \int_{-\infty}^{t} Rp(\tau,\theta) d\tau, \forall \theta \in S^{m-1} \quad (4)$$

$Rq(\cdot, \theta)$ is defined similarly, and finally the marginal distribution $Rp(\cdot, \theta)$ (and similarly $Rq(\cdot, \theta)$) is defined as:

$$Rp(t,\theta) = \int_X p(x)\delta(t - x \cdot \theta) dx, \forall \theta \in S^{m-1}, \forall t \in R. \quad (5)$$

It is noted that the discrete approximations of Equations (3), (4), and (5) (when the actual distributions are not available and only samples from these distributions are observed) are disclosed in Literature Reference No. 5.

In Equation (2), the SW distances are conditioned on the labels for both the source and target data sets. This is to ensure that distributions in the embedding space align correctly, based on label, for the source and target data. However, there are not any labels for the target dataset. This problem is circumvented by approximating $p_T(\phi_v(X_T)|C_j)$ through the generation of pseudo-labels for the target data points. Pseudo-labels are obtained from the source classifier prediction, but only for the portion of the target data that the source classifier provides confident prediction. This portion of high-confidence pseudo-labels are assigned based on a threshold $(p(y_i|x_i^t) > \tau$. As learning step 2 proceeds, the number of confident pseudo-labels increases because the source and target embedding distributions become more similar. This training process can be visualized in FIG. 5. Specifically, FIG. 5 depicts t_SNE (t-Distributed Stochastic Neighbor Embedding) visualizations showing how the embedding space evolves during training for the $\mathcal{U} \to \mathcal{S}$ task. In the target domain (element 406), the lighter points (similar to those shown in the source domain (element 404)) are examples with assigned pseudo-labels, which increase in number with the confidence of the classifier. While learning step 2 does optimize over Equation (2), each term of Equation (2) is optimized separately in an alternating fashion.

(3.3) Experimental Studies

To demonstrate the capability of the system and the unique formulation described herein, benchmarks in the vision community were utilized for digit recognition and object recognition. The method's flexibility in improving performance on multiple different encoder architectures for the same transfer task is described below. This allows differentiation of the benefit from the system according to embodiments of the present disclosure from the encoder network architecture itself, which other works do not do.

(3.3.1) Experimental Validation

The empirical performance of the system described herein was investigated on five commonly used benchmarks in unsupervised domain adaptation (UDA), namely: MNIST ($\mathcal{M}$), USPS ($\mathcal{U}$), Street View House Numbers ($\mathcal{S}$), CIFAR ($\mathcal{CI}$), and STL ($\mathcal{ST}$). The first three datasets are 10 class (0-9) digit classification datasets. MNIST and USPS are a collection of handwritten digits, whereas SVHN is a collection of real world RGB images of house numbers. STL and CIFAR contain RGB images that share 9 object classes: airplane, car, bird, cat, deer, dog, horse, ship, and truck. For the digit datasets, four of the six adaptation problems were considered in the experimental studies, as they are often seen in literature. For the MNIST and USPS tasks, 2000 randomly selected images from MNIST and 1800 randomly selected images from USPS were used. This selection process follows literature convention. The remaining cases use full datasets.

The full set of experimental results, along with comparisons to literature (state-of-the-art) performance can be found in the table depicted in FIGS. 6A and 6B. The table is broken into multiple segments. The first six rows show recent adversarial learning algorithms: Generate to Adapt (GtA) (see Literature Reference No, 9), CoGAN (see Literature Reference No. 10), ADDA (see Literature Reference No. 11), CyCADA (see Literature Reference No. 12), and I2I-Adapt (see Literature Reference No. 4). FADA (see Literature Reference No. 2) was also included, which is a few-shot learning technique similar to UDA but arguably solves an easier problem. The next five rows are methods that are similar to the method described herein because they learn an embedding space that couples both domains. They are RevGrad (see Literature Reference No. 13), DRCN (see Literature Reference No. 14), AUDA (see Literature Reference No. 15), OPDA (see Literature Reference No. 16), and MML (see Literature Reference No. 17). OPDA and MML are the most similar as they match distributions explicitly in the embedding domain.

The two rows between the double lines (FIG. 6B) show accuracies for the target datasets with all samples fully labeled. These rows act as upper bounds for the results according to embodiments of the present disclosure in the following rows. In each section of the experimental results, the performance on the target data using the resulting network from training step 1 is included, but for multiple different encoder architectures. This is a crucial observation as it demonstrates that, in some cases, a trained deep network with good data augmentation can extract domain agnostic features without the need for a more advanced/subsequent domain adaptation procedure. The second row of each section of the experimental results demonstrates that the method described herein (DACAD) is effective in transferring knowledge to boost the initial performance leading to near- or state-of-the-art performance across the task. Finally, it is noted that the method according to embodiments of the present disclosure provides a statistically significant boost in all but two of the cases (outlined by box in FIG. 6B).

Existing technologies, such as Motiian (see Literature Reference No. 2), describe learning a joint embedding subspace for both target and source domains to align them in the embedding domain. As opposed to their method, the method described herein follows a direct probability matching method. While Luo et. al. (see Literature Reference No. 3) used this method, they used cross entropy loss as a measure of similarity between two domains to learn the joint embedding directly without using adversarial learning. However, cross entropy is not a suitable measure when deep learning models are used. To tackle this challenge, Wasserstein distance was used, as described in detail above. Moreover, prior work on transfer learning (see Literature Reference No. 4) focused on joint optimization over the source and target domains and required having to learn models from scratch. In contrast, the method according to embodiments of the present disclosure considers a setting where the model is trained on the source domain and the goal is to adapt the model to work well in the target domain.

The ability for a system to adapt to domain shifts in the input data without any human intervention is desirable in various research areas as well as industrial arenas including, autonomous systems, and Intelligence, Surveillance and Reconnaissance (ISR) systems. Further, a machine's task covers a wide spectrum, including object recognition for autonomous systems when sensors are dirty, changed, or degraded, grabbing similar, but modified, parts (e.g., in a manufacturing setting), and interpreting speech in different environments (e.g. inside a noisy vehicle). A key requirement for such systems is to maintain high performance on the task despite domain shifts in the input data. The invention described herein meets this requirement.

Non-limiting examples of autonomous learning agents that can be controlled via the processor 104 include a motor vehicle or a motor vehicle component (electrical, non-electrical, mechanical), such as a brake, a steering mechanism, suspension, or safety device (e.g., airbags, seatbelt tensioners, etc.). The autonomous learning agent can also be a robot. Further, the autonomous learning agent could be an unmanned aerial vehicle (UAV), an autonomous self-driving ground vehicle, or a human operated vehicle controlled either by a driver or by a remote operator. For instance, if the task to be learned and performed is object detection and classification, the system can cause the autonomous vehicle to perform a driving operation/maneuver (such as steering or another command) in line with driving parameters in accordance with the recognized object. For example, if the system recognizes a bicyclist, another vehicle, or a pedestrian in the environments surrounding the autonomous driving system/vehicle, the system described herein can cause a vehicle maneuver/operation to be performed to avoid a collision with the bicyclist or vehicle (or any other object that should be avoided while driving). The system can cause the autonomous vehicle to apply a functional movement response, which may be the task to be performed, such as a braking operation followed by a steering operation (etc.), to redirect the vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for unsupervised domain adaptation in an autonomous learning agent, the system comprising:
one or more processors and a non-transitory computer-readable medium having executable instructions encoded thereon such that when executed, the one or more processors perform operations of:
adapting a learned model with a set of unlabeled data from a target domain, resulting in an adapted model, wherein the learned model was previously trained to perform a task using a set of labeled data from a source domain;
wherein the set of labeled data has a first input data distribution, and the set of unlabeled target data has a second input data distribution that is distinct from the first input data distribution;
generating pseudo-labels for the set of unlabeled data;
using sliced-Wasserstein (SW) distance as a dissimilarity measure for determining dissimilarity between the first input data distribution and the second input data distribution;
implementing the adapted model in the autonomous learning agent; and
causing the autonomous learning agent to perform the task in the target domain.

2. The system as set forth in claim 1, wherein the SW distance is conditioned on labels from the set of labeled data and the pseudo-labels to align the first input data distribution and the second input data distribution.

3. The system as set forth in claim 1, wherein the autonomous learning agent is an autonomous driving system and the task is a functional movement response.

4. A computer implemented method for unsupervised domain adaptation in an autonomous learning agent, the method comprising an act of:
causing one or more processors to execute instructions encoded on a non-transitory computer-readable medium, such that upon execution, the one or more processors perform operations of:
adapting a learned model with a set of unlabeled data from a target domain, resulting in an adapted model, wherein the learned model was previously trained to perform a task using a set of labeled data from a source domain;
wherein the set of labeled data has a first input data distribution, and the set of unlabeled target data has a second input data distribution that is distinct from the first input data distribution;
using sliced-Wasserstein (SW) distance as a dissimilarity measure for determining dissimilarity between the first input data distribution and the second input data distribution;
generating pseudo-labels for the set of unlabeled data;
implementing the adapted model in the autonomous learning agent; and
causing the autonomous learning agent to perform the task in the target domain.

5. The method as set forth in claim 4, wherein the SW distance is conditioned on labels from the set of labeled data and the pseudo-labels to align the first input data distribution and the second input data distribution.

6. The method as set forth in claim 4, wherein the autonomous learning agent is an autonomous driving system and the task is a functional movement response.

7. A computer program product for unsupervised domain adaptation in an autonomous learning agent, the computer program product comprising:
computer-readable instructions stored on a non-transitory computer-readable medium that are executable by a computer having one or more processors for causing the processor to perform operations of:
adapting a learned model with a set of unlabeled data from a target domain, resulting in an adapted model, wherein the learned model was previously trained to perform a task using a set of labeled data from a source domain;
wherein the set of labeled data has a first input data distribution, and the set of unlabeled target data has a second input data distribution that is distinct from the first input data distribution;
using sliced-Wasserstein (SW) distance as a dissimilarity measure for determining dissimilarity between the first input data distribution and the second input data distribution;
generating pseudo-labels for the set of unlabeled data;
implementing the adapted model in the autonomous learning agent; and
causing the autonomous learning agent to perform the task in the target domain.

8. The computer program product as set forth in claim 7, wherein the SW distance is conditioned on labels from the set of labeled data and the pseudo-labels to align the first input data distribution and the second input data distribution.

9. The computer program product as set forth in claim 7, wherein the autonomous learning agent is an autonomous driving system and the task is a functional movement response.

* * * * *